(12) United States Patent
Cherry et al.

(10) Patent No.: US 11,468,455 B2
(45) Date of Patent: Oct. 11, 2022

(54) AUTOMATIC DETERMINATION OF CARD DATA BASED ON NETWORK CATEGORY CODES

(71) Applicant: PayPal, Inc., San Jose, CA (US)

(72) Inventors: Ariane Wesleigh Cherry, Chicago, IL (US); Nakul Gupta, Chicago, IL (US); Christopher McFall, Brooklyn, NY (US); Rebecca Sloan Newman, Brooklyn, NY (US)

(73) Assignee: PAYPAL, INC., San Jose, CA (US)

( * ) Notice: Subject to any disclaimer, the term of this patent is extended or adjusted under 35 U.S.C. 154(b) by 171 days.

(21) Appl. No.: 16/917,633

(22) Filed: Jun. 30, 2020

(65) Prior Publication Data
US 2021/0406923 A1 Dec. 30, 2021

(51) Int. Cl.
*G06Q 30/00* (2012.01)
*G06Q 30/02* (2012.01)
*G06Q 20/34* (2012.01)

(52) U.S. Cl.
CPC ......... *G06Q 30/0201* (2013.01); *G06Q 20/34* (2013.01); *G06Q 30/0234* (2013.01)

(58) Field of Classification Search
CPC .................................................. G06Q 20/34
See application file for complete search history.

(56) References Cited

U.S. PATENT DOCUMENTS

| 11,017,418 | B1* | 5/2021 | Avratiner | G06Q 30/0206 |
| 2010/0250354 | A1* | 9/2010 | Waucampt | G06Q 30/02 235/379 |
| 2021/0027357 | A1* | 1/2021 | Bonfigli | G06Q 30/0627 |
| 2021/0042780 | A1* | 2/2021 | Suresh | G06Q 20/24 |

OTHER PUBLICATIONS

HMBradley, "HMBradley Credit Card Rewards Terms and Conditions," 4 pages.

* cited by examiner

*Primary Examiner* — Alvin L Brown
(74) *Attorney, Agent, or Firm* — Haynes and Boone, LLP (57) ABSTRACT

There are provided systems and methods for automatic determination of card data based on network category codes. A user may engage in a transaction with another user, such as a purchase of goods, services, or other items a merchant using a physical payment card. An online transaction processor may receive information from processing of the payment card over an electronic card network so that the online transaction processor may determine data for the payment card. The data may be determined over a time period, which may be dynamically adjusted based on additional data for the user, time period, and/or payment card. The data is further identified and determined based on network category codes for different transaction data when processed over the electronic network. Thereafter, categories of data may be selected to provide benefits back to the user's account or payment card.

20 Claims, 5 Drawing Sheets

AUTOMATIC DETERMINATION OF CARD DATA BASED ON NETWORK CATEGORY CODES

TECHNICAL FIELD

The present application generally relates to determining data using category codes specific to data networks and more particularly to tracking data using merchant category codes for an electronic card transaction network for providing card services.

BACKGROUND

Users may utilize online transaction processors for processing payments between different entities through device applications and digital accounts. Further, these online transaction processors may also provide physical payment cards for in-person transaction processing and merchant locations. Online transaction processors may wish to aggregate data associated with card usage, such as by different category codes used for processing card transactions through electronic card networks. These electronic card networks may facilitate communications between point-of-sale (POS) devices and other merchant devices with backend card processors by formatting data for communications and providing data codes for identification and categorization of transmitted data. However, electronic card networks may be separate from digital networks used for electronic communications between user devices and online platforms and servers of the online transaction processors. Thus, in order to aggregate data, the online transaction processors may require specific integrations with electronic card networks and usage of category codes to detect and aggregate the transmitted data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automatic determination of card data based on network category codes. Systems suitable for practicing methods of the present disclosure are also provided.

A user may utilize a payment card to process payments through an electronic card or a transaction network associated with a backend payment processor or other entity on the network. This payment card may be linked to a digital account of the user with an online transaction processor, such as a payment service provider (e.g., PayPal®), which may provide electronic transaction processing services to users through the account and one or more websites and/or applications of the online transaction processor or a merchant. The online transaction processor may include an integration with the electronic card network that allows for data exchange and communications between the two networks. Thereafter, as the user utilizes the payment card to process transactions, the online transaction processor may utilize the integration to monitor, track, and/or aggregate data for the processed transactions. This may include aggregating transactions by merchant category codes (MCCs), which correspond to universally or globally unique identifiers (UUIDs or GUIDs), or by other identifiers that specifically associate a transaction and/or a merchant with a particular categorical identifier or other descriptors. This data processing may occur in certain time intervals or after a time period or cycle, such as weekly, monthly, or the like (e.g., after a billing cycle). Utilizing the processed data, the online transaction processor may then determine and dynamically provide benefits or rewards to users based on specific categories or other aggregated data.

For example, a user may wish to process a purchase of the items via a digital account and/or payment card that provides values, credit, or other funds to the user through an online transaction processor and/or electronic card network. Selection of one or more items in an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®), as well as the payment card (e.g., through proffering the card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation. Account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In order to pay for the transaction (e.g., a transfer or payment to another user, merchant, or other entity), the user may provide the payment card or funding source information or may login to an account with the service provider through authentication information and process the transaction using the account. A payment may then be issued to the other party to the transaction and transaction information may be stored with the digital wallet or account. In this regard, a digital token or other data may authorize and/or authenticate the user for their digital wallet use and/or a payment instrument in the digital wallet, which may be transmitted to another party (e.g., the agent and/or merchant) for payment processing. The data may be stored to one or more storage mediums on the payment card, such as a magnetic stripe or an EMV chip. For example, a POS device and/or card reader may be used to read the card data from a merchant device at a merchant location. This may allow for single user payments through a payment account and/or digital wallet. In some embodiments, the account and/or digital wallet may be linked to the user's device or application and a one-touch checkout process may be authorized by the user, where selection of the account or other data may automatically initiate the process to purchase the item using the account and/or digital wallet.

Thus, a transaction may be processed using the payment card and/or digital account, which may generate and process transaction data for the transaction on a digital network. The online transaction processor may receive, aggregate, and process this transaction data based on identifiers and other information within the transaction data, such as MCCs identifying a particular category for each transaction. The transaction data may further include information, such as one or more items, item costs (e.g., itemizations) and/or a total cost, a transaction time, a corresponding merchant or merchant identifier, other users involved in the transaction, a transaction location, and/or other transaction data. The online transaction processor may provide electronic transaction processing services used to process the transaction using the transaction data and/or card data. However, in other embodiments, in order to receive this data, the online transaction processor may be required to interface with a backend card processor and/or electronic card or transaction network that transmits, receives, and/or processes the transaction data. In this regard, the online transaction processor may utilize an application programming interface (API) to communicate and integrate with one or more APIs of the electronic card network. This allows the online transaction processor to detect, receive, and process the transaction data, for example, by aggregating transactions by MCCs or other identifier associated with the transactions when the transactions are processed on the electronic card network. Thereafter, the transaction data may be detected and/or transmitted to the online transaction processor via one or more APIs. This may include receiving and processing the data in real-time, such as when the transactions occur. Alternatively, the data may be provided to the online transaction processor at the completion of a time period or cycle, such as after a billing statement.

Thereafter, when the transaction data for a time period or cycle is determined by the online transaction processor, the transaction data may then be processed to determine one or more totals or other aggregated data for the time period. For example, each MCC or other code may be used to aggregate and collect the corresponding transactions for that MCC, such as transactions in gas, groceries, entertainment, and the like. MCCs may also have subcategories within an MCC, such as phone services or electricity within a broader utilities category. Additionally, some MCCs may be aggregated together and/or combined for a larger overall category having two or more MCC transaction. For example, the MCC for groceries, dining, and the like may be combined into a collected category for food. One or more categories may also be generated based on other transaction data, such as location, time, and/or merchant name or type instead of or with utilization of UUIDs or GUIDs on a particular electronic card processor network. Once the categories for aggregation are determined, the transactions for the time period may then be aggregated within that categorization.

Aggregating the transactions may allow for aggregating the transaction data for those transactions over the time period. Thereafter, transaction data for the transactions may be aggregated and combined, such as a total amount, tax amount, individual or group of item amount, locations, merchant names or types, and/or other data. Thereafter, the online transaction processor may select one or more of the categories of aggregated data to provide a benefit or reward to the payment card's account and/or the corresponding digital account with the online transaction processor. For example, the online transaction processor may select a highest transaction total category based on the aggregated data. In such embodiments, the highest transaction total category may correspond to $1,000 that was spent on groceries, which represents the highest amount total for the aggregated totals per category. The online transaction processor may also select one or more other categories, such as a second highest total, a third highest total, and so on. In other embodiments, different selection criteria may be used to select a category. For example, instead of utilizing a highest total, a particular location may be used to select a category, such as transactions and/or MCCs closest to the user's home or work address. The user may also establish one or more preferences for automatic category selection, such as categories preferred at certain times of year, preferences based on purchases desired by the user, a calendar or schedule or the user's activities, purchases, and/or travel, and the like.

In some embodiments, the selection of the particular categories to utilize for providing a reward may be predictive and/or dynamic depending on other data. For example, spending habits and/or predictive or upcoming expenditures may be used to select a particular category. In such embodiments, a known upcoming expenditure, such as upcoming travel or purchases required by the user (e.g., a planned purchase of furniture, a vehicle or house, etc.), may be used to select a category at a particular time of year or during specific weeks, months, or other time periods. In this regard, a category may be selected based on a likely or known upcoming purchase. The category may also be selected to provide a specific benefit that may assist in paying for and/or discounting the planned purchase in a specific category or based on an MCC. This may include providing a value reward, balance adjustment, digital or virtual asset (e.g., airline miles), or other reward that may assist the user in receiving a discount or a better purchase price or plan for the planned purchase. In further embodiments, the selection of the category or categories for rewards may be predictive and/or time-based. For example, during a Christmas season or other yearly season, time of year or month, etc., the user may wish to have additional value balances and/or gift rewards, which may be based on particular predicted purchase(s) of the user. This may include providing benefits or rewards for a particular category so that the corresponding value or other reward provided to the user in a predictive manner assists the user with a purchase in a particular category.

The reward or benefit may correspond to a percentage or fixed amount corresponding to the selected categories transaction total. For example, a 3% cashback or value total increase may be provided based on the highest transaction total for a selected MCC. A second or further reward may be provided, such as an additional 3% for the next highest category's transaction total, or in decreasing fashion, such as 2% for the next highest category's transaction total, 1% for the third, as so on. The reward may also be a different amount or currency, such as a set amount (e.g., $25 back, 5,000 miles, or the like). Thus, different currencies, including virtual or digital currencies may also be provided. Further, a base reward may be provided to all or a subset of the other categories, such as by providing a 1% cash or value-back reward to the other unselected categories. Once the reward(s) are determined, the rewards may be provided to the user's digital account and/or to the payment card's account or balance. For example, a balance or other value in or available to the digital account or payment card may be increased by a certain amount for the corresponding reward.

When providing rewards, a user interface may be generated and dynamically populated with the data for the corresponding reward. For example, the online transaction processor may utilize an on-device application, such as a resident application that provides account and/or card functionality or a website for the online transaction processor, to provide an interface having the reward. The online transaction processor may dynamically generate the interface, including an executable process for an application on the user's device that allows the user to view and accept the reward. The interface may be automatically presented and populated in an application and/or user interface of the device. This may include within the chat or communication application, window, or interface, dynamically rendering a notification, pop-up, or another message. The interface may correspond to a selectable option, menu, or other displayable interface of the computing device, such as an operating system graphical user interface (GUI) or an application interface. The interface may be specifically generated for the reward corresponding to the selected category. The interface may therefore correspond to displayable data for the reward, account statement, aggregated data categories, and the like. The generated interface may then be displayed through a GUI of the user's computing device. For example, the interface may be dynamically generated and then displayed and rendered through the GUI so that the user may view item information, merchant information, and other information about the categories, past transactions, and/or rewards, so that the most relevant content at the time of the transaction is presented to the user, thereby improving use of the displayable area of the GUI.

Additionally, providing of the reward may be flexible and change over time. For example, every time period, such as every monthly billing cycle, the reward benefit and corresponding category may be recalculated and aggregated so that the MCC or other categorical identifier and transaction total may be recalculated and selected based on a highest transaction total, thereby providing a maximized reward or benefit to the user's balance. This may be performed automatically, thereby not requiring input by the user. In some embodiments, the time period may be dynamic, and/or the data may be aggregated based on dynamic or changing time periods. Thus, the online transaction processor or other service provider may receive and select categories for transaction totals based on recurring or different time periods. The time period selected to aggregate the data may also be dynamic, such as by selecting certain times of year based on seasons, user preferences, or the like. For example, the time period may be two months or two statement cycles to account for purchases during Christmas season (which may extend from Black Friday through the end of December) or based on a different time period.

Figure 1:
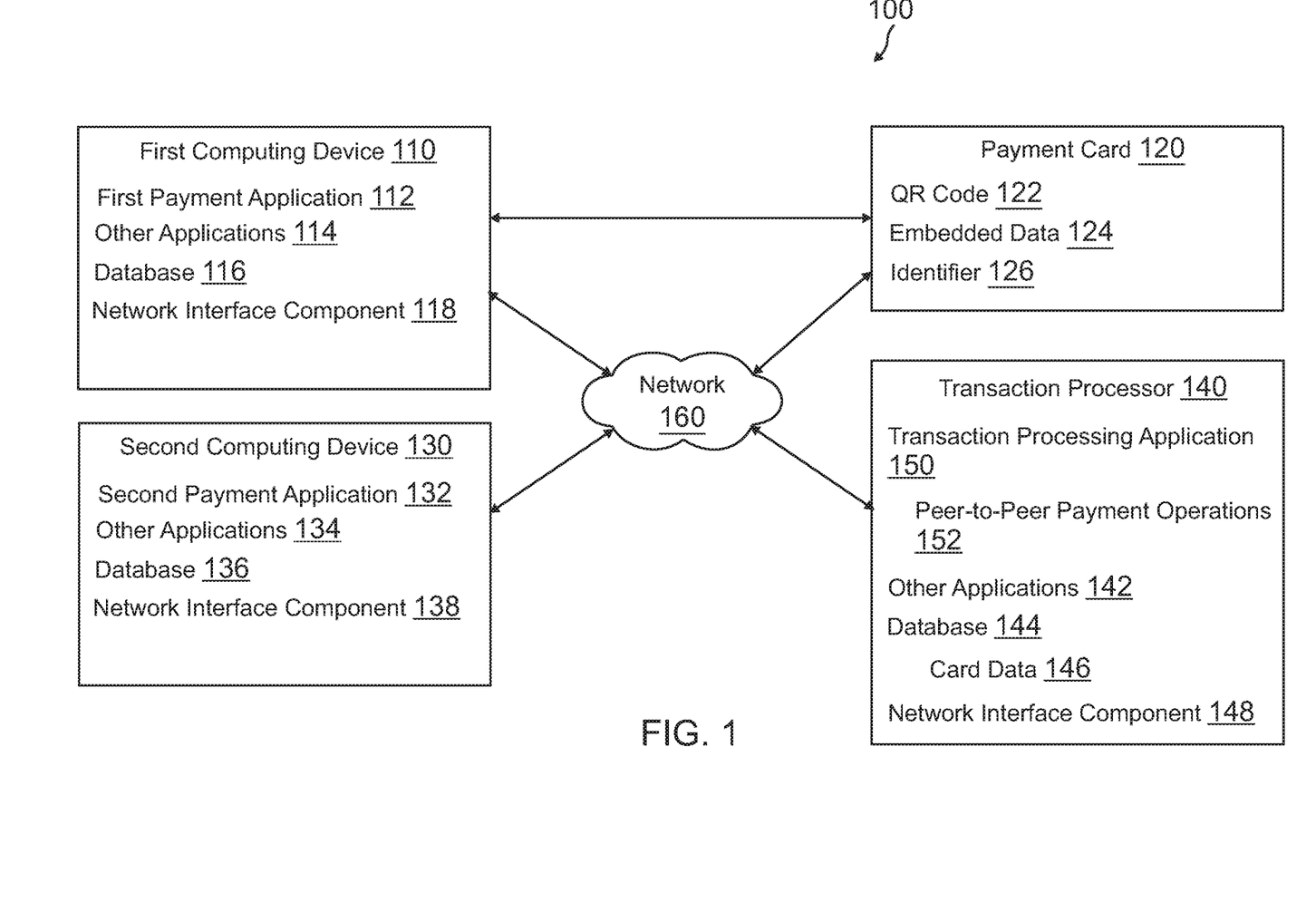
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first computing device 110, a payment card 120, a second computing device 130, and a transaction processor 140 in communication over a network 160. First computing device 110 may be used to establish a transaction and process a payment for the transaction using data from one or more of payment card 120 and/or second computing device 130. In this regard, when the transaction is processed, the transaction data for the transaction may be processed with payment card 120 over an electronic card or transaction network, which may be available over network 160. In further embodiments, electronic communications between first computing device 110 and second computing device 130 may be exchanged directly or over network 160 to process the transaction. Transaction processor 140 may then be used to aggregate transaction data for the transactions based on UUIDs, GUIDs, MCCs, or other categorical identifiers in order to provide rewards to a user associated with second computing device 130.

First computing device 110, second computing device 130, and transaction processor 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First computing device 110 may be implemented using any appropriate hardware and software configured for wired and/or wireless communication with payment card 120, second computing device 130, and/or transaction processor 140 for processing a transaction based on one or more of payment card 120 and/or second computing device 130. First computing device 110 may correspond to an agent or employee of a merchant that provides sales through a physical storefront or an online merchant marketplace, including merchant websites or other online platforms accessible through a browser application or resident device application. In various embodiments, first computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

First computing device 110 of FIG. 1 contains a first payment application 112, other applications 114, a database 116, and a network interface component 118. First payment application 112 and other applications 142 may correspond to executable processes, procedures, and/or applications with associated hardware. In other embodiments, first computing device 110 may include additional or different software as required.

First payment application 112 may correspond to one or more processes to execute modules and associated devices of first computing device 110 to provide a convenient interface to permit a merchant for first computing device 110 to enter, view, and/or process items the user wishes to purchase in an in-person or online transaction. In this regard, first payment application 112 may correspond to specialized hardware and/or software utilized by first computing device 110 that may provide transaction processing for the items using financial information from payment card 120 and/or second computing device 130. Thus, first payment application 112 may be implemented as an application having a user interface enabling the merchant to enter and/or view the items a user associated with second computing device 130 wishes to purchase. For example, the user of payment card 120 and second computing device 130 and/or the merchant or merchant's agent of first computing device 110 may indicate some item of interest to the user. This may be based on selected items brought to a register or POS device for first computing device 110, or based on communications associated with a current item, webpage, or interface for an item that second computing device 130 may be viewing. First payment application 112 may include a selectable interface option to request generation of the checkout process and checkout interface. This may be for item data for an item with first computing device 110, such as a merchant inventory system of first computing device 110. Once generated, first payment application 112 may display and render the interface for the checkout operations to complete a transaction for the item(s) based on processing transaction data with payment card 120 and/or second computing device 130, such as using card data or financial data from payment card 120 and/or second computing device 130.

Prior to payment and transaction processing, first payment application 112 may further enable the merchant to enter coupons and/or discounts for the items, edit the order including adding, removing, and/or modifying items, or other functions with regards the selected items in the purchase and provided through the checkout interface element. Once the items have been finalized for purchase by the user, a total may be calculated, and a transaction may be engaged with the user to complete payment for the selected items, for example, through card data stored to a storage medium (e.g., magnetic stripe and/or EMV chip) of payment card 120 and/or tokenized data or other information from second computing device 130. Thus, first computing device 110 may include a POS checkout component and/or card reader, including a magnetic stripe reader or EMV chip reader. In some embodiments, first payment application 112 may utilize a camera of first computing device 110 to capture a code on payment card 120 and/or presented by second computing device 130 that may be encoded with the payment data or used to receive the payment data. Thus, first payment application 112 may request and receive payment covering the selected items from the user. The transaction data having the corresponding payment or financial data may then be processed over an electronic card network and/or digital payment network. Transaction processor 140 may then receive the transaction data, such as by monitoring over a time period for the transaction data and/or receiving an account or billing statement. First payment application 112 may alert the merchant when payment for the transaction for the item(s) is completed and may generate a receipt to the user associated with second computing device 130.

In various embodiments, first computing device 110 includes other applications 114 as may be desired in particular embodiments to provide features to first computing device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, which may be used to determine a location for first computing device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of first computing device 110, such as display components capable of displaying information to users and other output components, including speakers.

First computing device 110 may further include database 116 which may include, for example, identifiers such as operating system registry entries, cookies associated with first payment application 112 and/or other applications 142, identifiers associated with hardware of first computing device 110, or other appropriate identifiers. Identifiers in database 116 may be used by a payment/service provider to associate first computing device 110 with a particular account maintained by the payment/service provider. Database 116 may also further store received transaction data, as well as processed transaction data. In various embodiments, electronic card network data and identifier, or other information used on a digital payment network, may be stored to database 116 for use with transmitting and processing transactions, such as MCCs used on a card network with a backend card processor.

First computing device 110 includes at least one network interface component 118 adapted to communicate with second computing device 130 and/or transaction processor 140 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment card 120 may correspond to a physical payment card and/or digital representation of a payment card that may be used to store card data corresponding to financial data used to process transactions. In some embodiments, payment card 120 may correspond to a standard sized card (e.g., ~85.×54 mm (3.37×2.125 in) card having rounded corners) that include one or more storage mechanisms (e.g., magnetic stripe, EMV chip, NFC chip and/or antenna, or the like). Payment card 120 may also correspond to a key fob or other device that similarly may include a storage mechanism and may store data. In some embodiments, payment card 120 may be virtual and may be stored to another device, such as second computing device 130.

Payment card 120 may include a QR code 122 or be associated with QR code 122, which may link to backend data that allows accessing of a digital account based on encoded data in QR code 122. The encoded data may be dynamically linked to different backend data so that when QR code 122 is read, different actions, operations, and/or data may be accessed and/or utilized. QR code 122 may correspond to a surface of payment card 122 or may otherwise be represented on or with payment card 120, including physical or digital representations of payment card 120. Payment card 120 may also be configured to store card data corresponding to a card account, value balance (e.g., account balance for a debit card), credit balance, or the like as embedded data 124. In other embodiments, embedded data 124 may be stored to other storage mediums, such as a non-transitory memory for an NFC or RFID chip and/or device. Identifier 126 may also be provided on or with payment card 120, which may correspond to a card and/or account identifier. For example, identifier 126 may correspond to a 16 digit or other series of digits and/or alphanumeric codes, that allows for specific identification of an account and use of payment card 120 to process transactions. Identifier 126 may include multiple identifiers, including a user name, an expiration date, and/or a CCV number.

Second computing device 130 may be implemented using any appropriate hardware and software configured for wired and/or wireless communication with first computing device 110, payment card 120, and/or transaction processor 140 for establishing and processing a transaction based on one or more of payment card 120 and/or second computing device 130. Second computing device 130 may correspond to user that requests items through sales, as well as views and receives rewards and benefits provided from aggregated transactions over a time period. In various embodiments, second computing device 130 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Second computing device 130 of FIG. 1 contains a second payment application 132, other applications 134, a database 136, and a network interface component 138. Second payment application 132 and other applications 134 may correspond to executable processes, procedures, and/or applications with associated hardware. In other embodiments, second computing device 130 may include additional or different software as required.

Second payment application 132 may correspond to one or more processes to execute software modules and associated components of first computing device 110 to process electronic transactions at a physical merchant location or over a network with an online marketplace, including browsing items available for a merchant and engaging in communications with the merchant to purchase items. In this regard, second payment application 132 may correspond to specialized hardware and/or software utilized by a user of second computing device 120 to process a transaction and/or view aggregated transactions or rewards. Second payment application 132 may further be utilized enter or receive transaction data for a transaction (e.g., a payment to another entity, such as a user, merchant, or other payee). At a physical merchant location, second payment application 132 may designate the items for purchase or the user may bring items to a checkout, where payment card 120 and/or second computing device 130 may provide card data, account data, or other financial data to process the transaction. With digital transactions, second payment application 132 may designate the items for purchase through the online marketplace for the merchant and provide the card data, account login and/or account data, financial data, or a digital token used to pay for the transaction data and perform transaction processing. Further, second payment application 132 may be used to access one or more account interfaces, which may allow the user of second computing device 130 to view transaction histories and aggregated transaction totals. The aggregated transaction totals may further display corresponding rewards and benefits provided for a dynamically determined time cycle and/or transaction category based on user data, such as spend habits, preferences, and past transactions.

During transaction processing, second payment application 132 may be utilized to select payment instrument(s) for use in providing payment for a purchase transaction, transfer, or other financial process. As discussed herein, second payment application 132 may utilize user financial information, such as credit card data, bank account data, or other funding source data, as a payment instrument when providing payment information. Additionally, second payment application 132 may utilize a digital wallet associated with an account with a payment provider as the payment instrument, for example, through accessing a digital wallet or account of a user through entry of authentication credentials and/or by providing a data token that allows for processing using the account. However, in other embodiments, payment card 120 may be used to provide such data. Second payment application 132 may also be used to receive a receipt or other information based on transaction processing. In various embodiments, second payment application 132 may correspond to a general browser application configured to retrieve, present, and communicate information over the Internet (e.g., utilize resources on the World Wide Web) or a private network. For example, second payment application 132 may provide a web browser, which may send and receive information over network 160, including retrieving website information, presenting the website information to the user, and/or communicating information to the website, including payment information for the transaction. However, in other embodiments, second payment application 132 may include a dedicated application of transaction processor 140 or other entity (e.g., a merchant), which may be configured to assist in processing transactions electronically.

In various embodiments, second computing device 130 includes other applications 134 as may be desired in particular embodiments to provide features to second computing device 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. Other applications 134 may also include other location detection applications, which may be used to determine a location for second computing device 130, such as a mapping application. Other applications 134 may include device interface applications and other display modules that may receive input from the user and/or output information to the user. For example, other applications 134 may contain software programs, executable by a processor, including a graphical user interface (GUI) configured to provide an interface to the user. Other applications 134 may therefore use components of second computing device 130, such as display components capable of displaying information to users and other output components, including speakers.

Second computing device 130 may further include database 136 which may include, for example, identifiers such as operating system registry entries, cookies associated with second payment application 132 and/or other applications 134, identifiers associated with hardware of second computing device 130, or other appropriate identifiers. Identifiers in database 136 may be used by a payment/service provider to associate second computing device 130 with a particular account maintained by the payment/service provider. Database 136 may also further store received transaction data for processed transactions, as well as card data, account data, or other financial data used to process such transactions.

Second computing device 130 includes at least one network interface component 138 adapted to communicate with first computing device 110 and/or transaction processor 140 over network 160. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 140 may be maintained, for example, by an online service provider, which may provide processes to provide account services and process payments, as well as aggregate transaction data based on different time periods or cycles. In this regard, transaction processor 140 includes one or more processing applications which may be configured to interact with first computing device 110, second computing device 130, and/or another device/server to facilitate communications and transactions between users. Transaction processor 140 may be maintained by or include another type of platform or service provider, for example, a transaction processor such as PAYPAL®, Inc. of San Jose, Calif., USA. Although first computing device 110 and transaction processor 140 are discussed as separate devices and servers, in some embodiments, one or more of the described processes of may instead be provided by the other device or server, or the same device or server.

Transaction processor 140 of FIG. 1 includes a transaction processing application 150, other applications 142, a database 144, and a network interface component 148. Transaction processing application 150, and other applications 142 may correspond to executable processes, procedures, and/or applications with associated hardware. In other embodiments, transaction processor 140 may include additional or different modules having specialized hardware and/or software as required.

Transaction processing application 150 may correspond to one or more processes to execute modules and associated specialized hardware of transaction processor 140 to process a transaction for item(s) with first computing device 110, payment card 120, and/or second computing device 130, which may be based on one or more transactions established with first computing device 110. In this regard, transaction processing application 150 may correspond to specialized hardware and/or software used by a user associated with first computing device 110 to establish an account with transaction processing application 150 by providing personal and/or financial information to transaction processor 140 and selecting authentication credentials. In various embodiments, the financial information may include payment instrument information, such as account/card numbers and information. The account may be used to purchase items and/or transfer funds, for example, through peer-to-peer payment operations 152 that allow for a peer-to-peer network and/or social networking environment that allows for interactions between different users, merchants, or other entities. The payment account may be accessed and/or used through a browser application and/or dedicated payment application. However, in other embodiments, a payment account may be generated by another online transaction processor or service provider and linked with transaction processor 140. Additionally, transaction processing application 150 may be used to create, establish, and/or link payment card 120 to the account of the user so that transactions processed using the card and/or the account may be aggregated for use in providing rewards and/or benefits to users based on different transaction categories. Transaction processing application 150 may process a payment and may provide a transaction history for transaction authorization, approval, or denial, Transaction processing application 150 may correspond to a product of service provider server 120 that may be utilized by end users, such as to perform electronic payments, transfers, and the like using one or more accounts and/or financial instruments. Transaction processing application 150 may also include or utilize different processors, engines, or models as required for an authentication, account setup and maintenance, electronic transaction processing, deposit and/or withdrawal, dispute resolution, and the like, for example, through peer-to-peer payment operations 152. Transaction processing application 150 may include one or more API integrations and/or interactions with an electronic card network in order to detect, receive, and aggregate transaction data over a time period. Thus, transaction processing application 150 may interact with the card network for payment card 120 and/or utilized by first computing device 110 used to process payment card 120 (e.g., through one or more API calls to APIs of transaction processing application 150 that interfaces with APIs of the electronic card network). Transaction processing application 150 may first determine that transaction data for transactions processed on the network.

Transaction processing application 150 may receive the transaction data for transactions processed using payment card 120 and/or the account accessible through second computing device 130. Transaction processing application 150 may then determine categories, such as based on transaction identifiers, transaction data, and/or card network codes or identifiers (e.g., MCCs). Once the categories are determined, transaction processing application 150 may collect or aggregate those transactions within the categories and may then determine transaction totals and/or other totals (e.g., items, tax, tip, etc.), which may be used to provide rewards to users. Further, once the categories are determined, one or more categories may be selected to provide rewards based on the transaction totals or aggregated total amounts. For example, a category having a highest transaction total may be selected for a first reward, such as 3% of the transaction total for that category. One or more further categories may also be selected, such as a next category having a second highest transaction total, a third category having a third highest transaction total, and the like. The reward or benefit may be provided in a scalar manner, such as 3% for the highest, 2% for the next highest, 1% for the third and/or all remaining categories and transactions, and the like. Other reward amounts or currencies may also be provided by transaction processing application 150. The reward or benefit may be provided to an account balance, fund or value balance or availability, credit balance or limit, or the like. Thus, the rewards may provide additional available values or balances to the user's account and/or payment card 120 so that the user may have additional monetary or digital funds.

In various embodiments, transaction processor 140 includes other applications 142 as may be desired in particular embodiments to provide features to transaction processor 140. For example, other applications 142 may include security applications for implementing server-side security features, programmatic client applications for interfacing with appropriate application programming interfaces (APIs) over network 160, or other types of applications. Other applications 142 may contain software programs, executable by a processor, including a graphical user interface (GUI), configured to provide an interface to the user when accessing transaction processor 140, where the user or other users may interact with the GUI to more easily view and communicate information. In various embodiments, other applications 142 may include additional connection and/or communication applications, which may be utilized to communicate information to over network 160.

Additionally, transaction processor 140 includes database 144. Database 144 may store various identifiers associated with first computing device 110. Database 144 may also store account data, including payment instruments and authentication credentials, as well as transaction processing histories and data for processed transactions. Database 144 may store received data associated with a user, such as tracked data of a user's transactions that may be aggregated over a time period. In some embodiments, card data 146 may be stored to database 144, which may correspond to payment card 120 and may be associated with an account of the user.

In various embodiments, transaction processor 140 includes at least one network interface component 148 adapted to communicate with first computing device 110, second computing device 130, and/or another device/server for a merchant over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
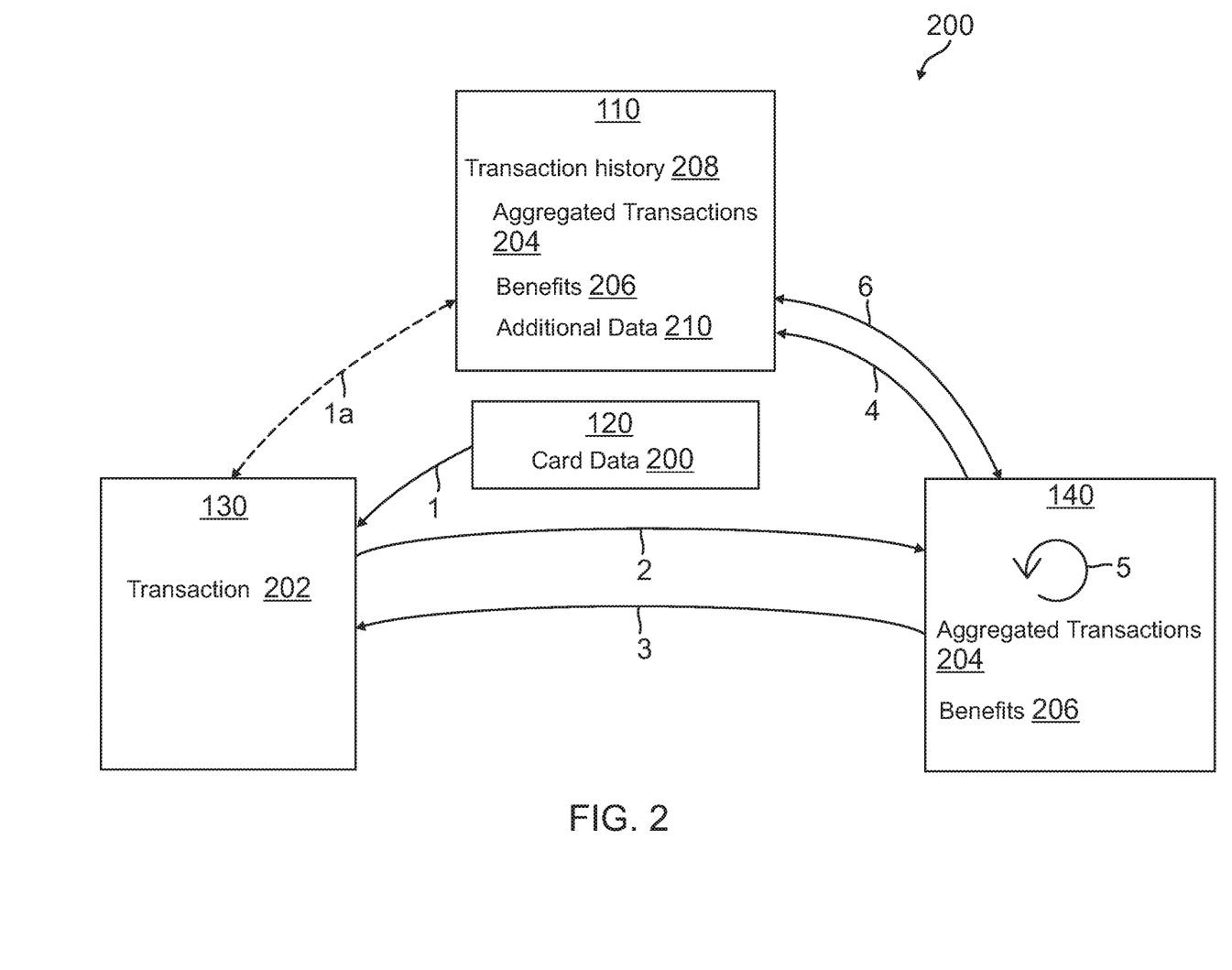
FIG. 2 is a block diagram of the communications between different device used to determine data from electronic card networks, according to an embodiment.

FIG. 2 is a block diagram of a system 200 illustrating communications between different device used to aggregate data from electronic card networks, according to an embodiment. System 200 of FIG. 2 includes first computing device 110, payment card 120, second computing device 130, and transaction processor 140 discussed in reference to system 100 of FIG. 1.

In system 200, different interactions and communications are shown in order to process transactions and aggregate transaction data for use in providing rewards or benefits based on different transaction categories. For example, in an interaction 1 initially occurring between a user and second computing device 130, a transaction 202 is established using card data 200 stored to payment card 120. The transaction may be for one or more items for purchase from a merchant corresponding to second computing device 130. Thus, transaction 202 may be associated with transaction data including information for the transaction (e.g., items, totals or amounts, tax, tip, merchant identifier, location, merchant device identifier, and category identifier, such as an MCC). The transaction data further includes card data 200 used to process transaction 202. In some embodiments, first computing device 110 may also or instead execute an application, such as first payment application 112 used to communicate with second computing device 130 for generating the transaction for one or more items for purchase at an optional interaction 1a. Once the data for transaction 202 is determined, second computing device 130 may process transaction 202 using card data 200, for example, using a payment card electronic processing network or other digital card network.

Once transaction 202 is established, at interaction 2, transaction 202 having card data 200 is transmitted to transaction processor 140. This may occur when processing transaction 202 using card data 200, such as when transaction processor 140 provides the electronic transaction processing network and services. However, in other embodiments, a backend card processor may be used to process transaction 202, where interaction 2 occurs by listening and/or monitoring for transaction processing events on the electronic transaction processing network for payment card 120. In various embodiments, at interaction 3, information is provided back to second computing device 130 by transaction processor 140 to confirm that data has been processed and/or recorded, such as a transaction history. Further, this transaction history may also be provided to first computing device 110 for documenting the processing of the transaction. For example, first computing device 110 may receive a receipt and/or access an account interface through a device application or website that may be used to view the results of transaction processing, such as when looking at an account or payment card interface and statement that includes processed and/or pending transactions.

Thereafter, one or more of interactions 1-4 may occur with additional transactions. At interaction 5, transaction processor 140 may then aggregate data for transactions within a time period into aggregated transactions 204. Aggregated transactions occurring at interaction 5 are generated from data accrued or received for a particular time period. The time period may be set, such as for each billing cycle. However, in other embodiments, the time period may instead be flexible or dynamic based on other available data, such as user spending habits, times or year, incoming transactions and/or transaction data, card and/or account usage patterns, and the like.

Using aggregated transactions 204, benefits 206 are determined by transaction processor 140, which may include rewards or other benefits that may be awarded based on transaction totals for selected categories. For example, benefits 206 may correspond to a percentage, amount, or other awarded value based on selecting a specific category and/or the selected category's transaction total. At interaction 6, data is provided to first computing device 110 for benefits 206. For example, a transaction history 208 for an account and/or payment card 120 may be provided through one or more interfaces to first computing device 110. Transaction history 208 includes aggregated transactions 204 and benefits 206 awarded for aggregated transactions 204. Transaction history 208 further includes additional data 210 that may be associated with aggregated transactions 204 and/or benefits 206. For example, additional data 210 may include information for different transaction categories and aggregated transaction information for aggregated transactions 204. Additional data 210 may also include information about the time period for aggregating data, the selection of a specific category (e.g., preferences, times of year or season, and other dynamic choices for selecting a category), or other information.

Figure 3:
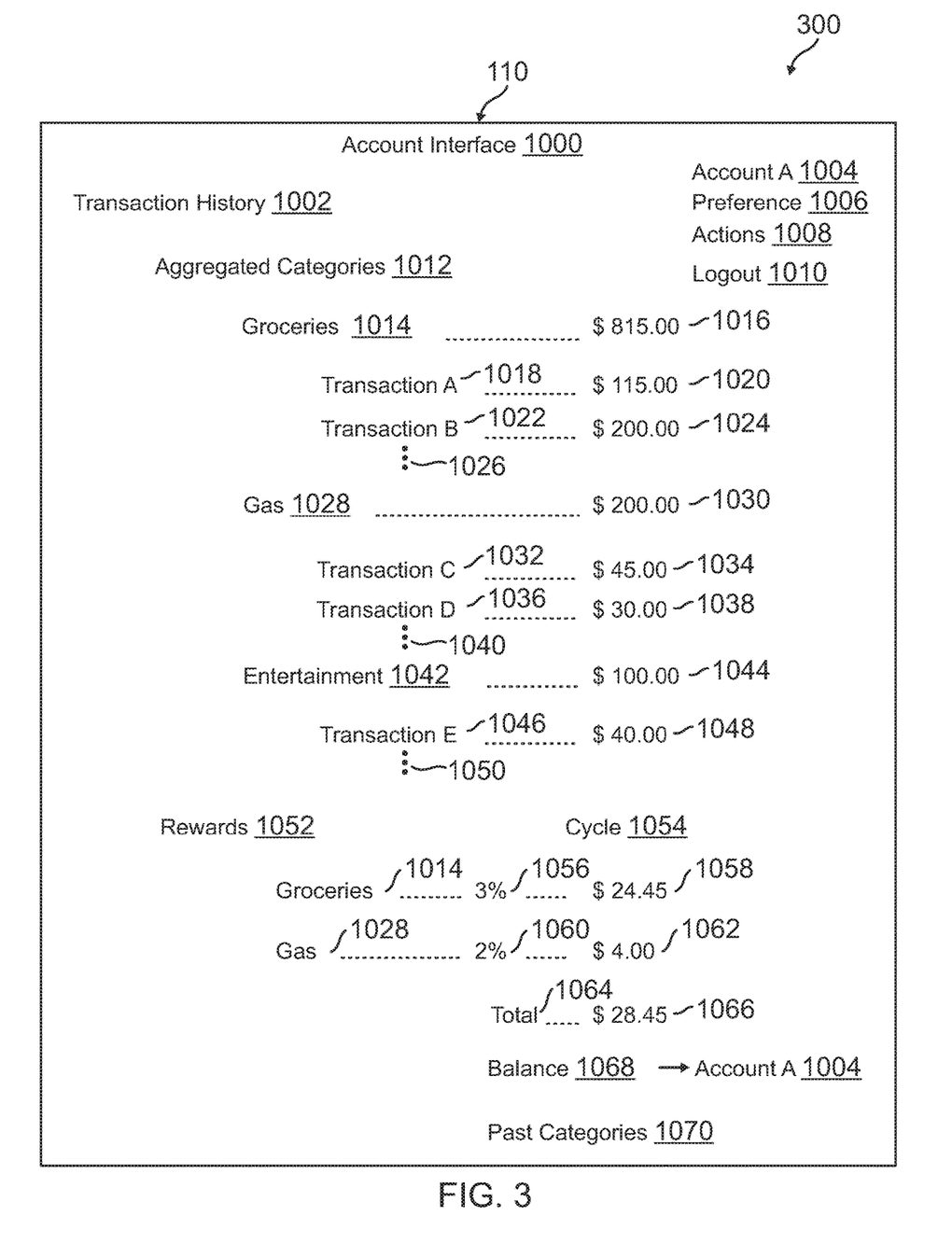
FIG. 3 is an exemplary interface of a device application showing data determined based on merchant category codes, according to an embodiment.

FIG. 3 is an environment 300 illustrating an exemplary interface of a device application showing aggregated data based on merchant category codes, according to an embodiment. Environment 300 of FIG. 3 includes first computing device 110 discussed in reference to system 100 of FIG. 1. In this regard, first computing device 110 displays a dynamically rendered or displayed interface for an application, such as first payment application 112, that may display aggregated data and corresponding benefits based on network or merchant category codes specific for a particular electronic processing network or other digital payment or card network.

Environment 300 therefore includes an account interface 1000 for the application of first computing device 110 that provides data within a rendered or displayed user interface (UI) or GUI. Account interface 1000 may be displayed from data received from a service provider, such as transaction processor 140 in system 100 of FIG. 1. Account interface 1000 includes a transaction history 1002 for an account A 1004. Within account interface 1000 for account A 1004, different options may be provided to the corresponding user to establish data with account A 1004 through preference 1006 (e.g., reward preferences, preferences for MCCs or transaction categories, season reward preferences, and the like), perform different actions 1008 (e.g., request a reward payout, process a transaction, and the like), and/or perform an authentication or logout 1010.

Within transaction history 1002, aggregated categories 1012 may be found and rewards 1052 for cycle 1054 may be provided based on aggregated categories 1012 over cycle 1054. For example, aggregated categories 1012 may include groceries 1014 having a transaction A 1018, a transaction B 1022, and expandable grocery transactions 1026. Aggregated categories 1012 further includes gas 1028 having a transaction C 1032, a transaction D 1036, and expandable gas transactions 1040. Lastly in aggregated categories 1012 is entertainment 1042 having a transaction E 1046 and expandable entertainment categories 1050. Each of transaction A 1018, transaction B 1022, transaction C 1032, transaction D 1036, and transaction E 1046 may correspond to selectable interface elements that may allow a user to interact with underlying data by selecting the interface elements, expanding the data, and/or requesting additional data or performing a transaction dispute. Similarly, expandable groceries categories 1026, expandable gas categories 1040, and expandable entertainment categories 1050 may be selectable interface elements to expand and view additional transactions or other data for cycle 1054 or other transaction cycle/time period.

Each of groceries 1014, gas 1028, and entertainment 1042 may further be associated with a transaction total for cycle 1054, while each underlying transaction may also be associated with a transaction amount. For example, groceries 1014 is shown having a groceries total 1016 with the highest overall transaction total of $815.00, with transaction A 1018 having a transaction A amount 1020 of $115.00 and transaction B 1022 having a transaction A amount 1024 of $200.00. Gas 1028 is shown with a gas total 1030 of the next highest total of $200.00, with transaction C 1032 having a transaction C amount of $45.00 and transaction D 1036 having a transaction D amount of 1038. Finally, entertainment 1042 is shown with an entertainment total 1044 of $100.00, which may be the third highest total or the lowest total, depending on the total amount of transaction categories. Transaction E 1046 is shown with a transaction E amount 1048 of $40.00.

Based on the data shown under aggregated categories 1012, rewards 1052 may be determined and provided to account A 1004, such as to a balance 1068 for account A 1004. Balance 1068 may be usable by account A 1004 and/or the payment card linked to account A 1004, such as a physical credit/debit card including card data. Thus, for groceries 1014, a highest percentage reward 1056 from groceries total 1016 is shown as 3% cash or value back, which results in highest reward 1058 of $24.45. Next, for the second highest category total for gas 1028, a second highest percentage reward 1060 from gas total 1030 is shown as 2% cash or value back, which results in second highest reward 1062 of $4.00. When providing rewards 1052 to account A 1004 a total 1064 may be determined that has a combined amount 1066 for highest reward 1058 and second highest reward 1062, shown as $28.45. Thus, total 1064 may then be applied to balance 1068 so that total 1064 may be accessible and usable by the user via account A 1004 and/or the corresponding payment card.

Finally, no reward is provided to entertainment 1042 for being the third or last highest category total. However, in some embodiments, an additional reward may be provided, such as 1% or another flat percent that may apply to the third highest total or all other category totals. Additionally, although percentage rewards are shown, different rewards may also be provided, such as flat amounts back, airline miles or different digital currency, and the like. Further, although categories are shown as separate, categories may be dynamically combined and/or cycle 1054 may be adjusted based on user spend habits, time of month or year, or other variable data that allows for different determinations of rewards 1052. For example, during a holiday season, groceries 1014 and entertainment 1042 (or another category for items such as shopping, electronics, clothes, and the like) may be combined together due to the similar expenditures by a user within that timeframe. Additionally, cycle 1054 may be dynamically adjusted to account for expenditures in groceries 1014 for both Thanksgiving, Christmas, and New Year's Eve/Day food that may account for hosted parties with family and friends.

Figure 4:
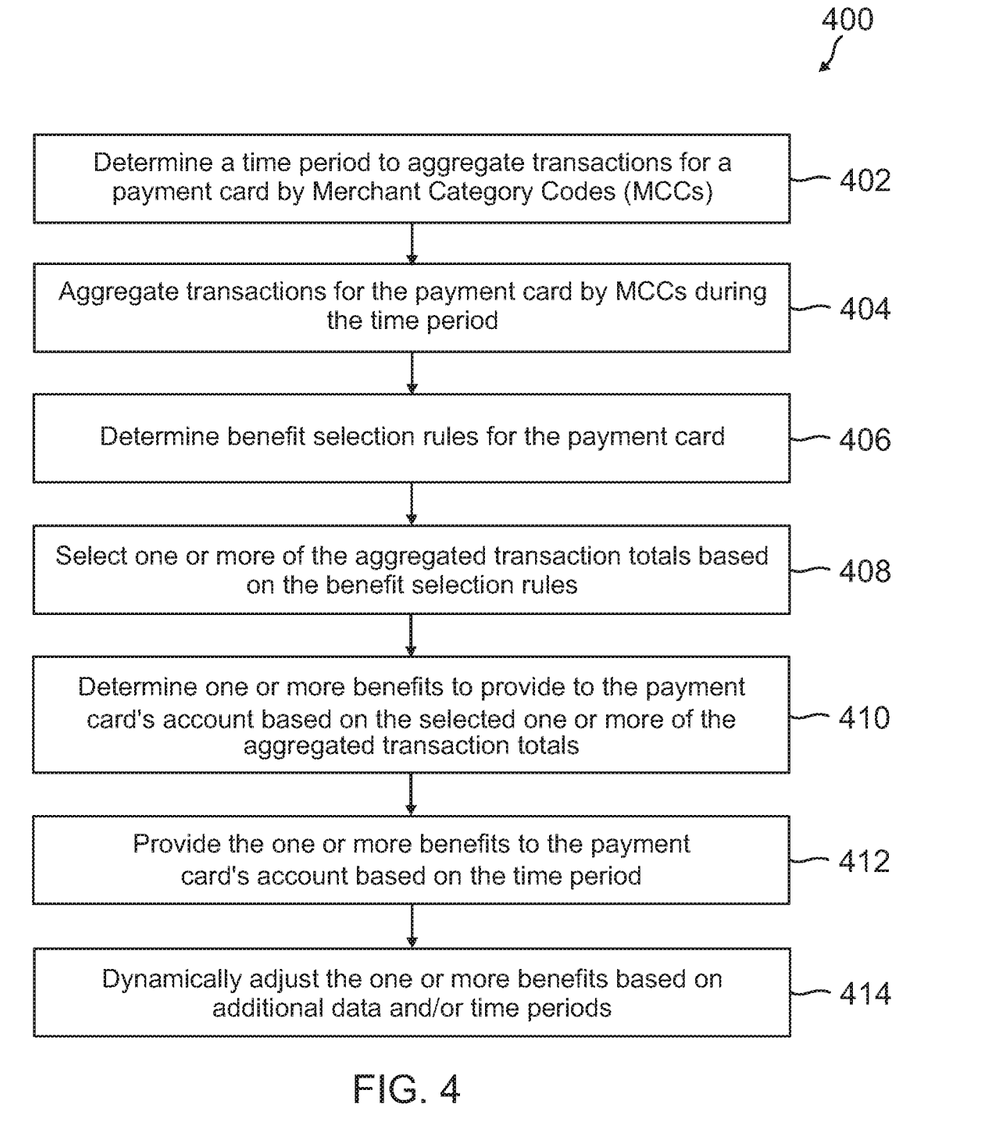
FIG. 4 is a flowchart of an exemplary process for automatic determination of card data based on network category codes, according to an embodiment.

FIG. 4 is a flowchart 400 of an exemplary process for automatic aggregation of card data based on network category codes, according to an embodiment. Note that one or more steps, processes, and methods described herein of flowchart 400 may be omitted, performed in a different sequence, or combined as desired or appropriate.

At step 402 of flowchart 400, a time period to aggregate transactions for a payment card by merchant category codes (MCCs) is determined. The payment card may be associated with a user and may be linked to an online digital account for the user, such as one with a peer-to-peer payment and/or social networking network. For example, the user may open the payment card with an online transaction processor and/or electronic card processing network and may link the card to the user's digital account so that credit and/or balances may be used and/or shared between the two. The network used to aggregate transactions may also have different UUIDs, GUIDs, MCCs, or other network category codes that are used to identify a transaction spend category corresponding to the transaction. For example, an identifier or other code on a network for a transaction may correspond to groceries, gas, entertainment, electronics, shopping, travel, or the like.

Thereafter, the online transaction processor may determine to aggregate transactions for the payment card and/or digital account so that rewards may be provided to the user. The time period may correspond to a particular establish time cycle or period, such as monthly, weekly, or by billing cycle. Further, the time period may be dynamically adjusted based on spending habits or additional data for the user and/or user's account/payment card. For example, the user may purchase specific items in a time period, which may be determined based on based analytic data and/or transaction histories of the user. In this regard, the user may purchase more groceries, entertainment, shopping/electronics, or the like during certain weeks, months, or seasons of a year. The user's likely spend habits may also be crowdsourced and/or determined for a large group of users, such as spend habits during a holiday season, summer, back to school time period, or the like. Thus, the particular time period may be dynamically adjusted in different time cycles to account for different combinations of weeks, months, or the like in order to aggregate particular transactions that may account for the user's spend habits.

At step 404, transactions are aggregated for the payment card by the MCCs (or other network category code identifiers) during the time period. The transactions may be aggregated by individual MCCs over the time period, such as by aggregating by travel or groceries. However, the transaction categories may also be combined or the transactions may be aggregated by different categories, such as merchants, locations, or times of day/week/month based on different preferences or spending habits of the user. For example, the user may spend more or process more transactions with merchants within a geographical area or at certain times of day, which may be used to adjust the categories used to aggregate transactions.

Benefit selection rules for the payment card are then determined, at step 406. The benefit selection rules may be determined in order to select which aggregated categories of transactions having an aggregated transaction total, may be used for selecting to provide benefits or rewards to a user. For example, the benefit selection rules may provide that the highest transaction total category and the second highest transaction total category may receive a decreasing amount of benefits or rewards, such as a 3% cashback and a 2% cashback reward, respectively. However, other selection criteria and rules may also select different categories, for example, to provide different rules based on spend habits, time of year, or the like. Thus, at step 408, one or more of the aggregated transaction totals are selected based on the benefit selection rules. This may include selecting just one category or selecting categories in sequence (e.g., decreasing highest totals) based on the rules.

At step 410, one or more benefits to provide to the payment card's account are determined based on the selected one or more of the aggregated transaction totals. The benefits may correspond to a percentage or flat value reward or benefit amount of a cash balance, digital currency or value, or other available value (e.g., balance adjustment for a statement). The benefits may also correspond to other physical or digital values, such as items, gift cards, coupons to different merchants, travel credits, and the like. Thus, the benefits may be provided based on transaction totals for selected benefit categories or may be other benefits determined for the account. Once the benefits are determined, at step 412, the one or more benefits are provided to the payment card's account based on the time period. This may include providing a balance adjust or otherwise provide a real or digital currency to the account for use by the user with the account or payment card. Finally, after the benefit(s) have been provided, a new time period and/or additional data are used to dynamically adjust the one or more benefits provided to the user's account, at step 414. For example, in subsequent time periods, the benefits and/or time periods may be dynamically adjusted to account for changes in spend habits and additional data (e.g., time of year, different merchant or MCC combinations, and the like).

Figure 5:
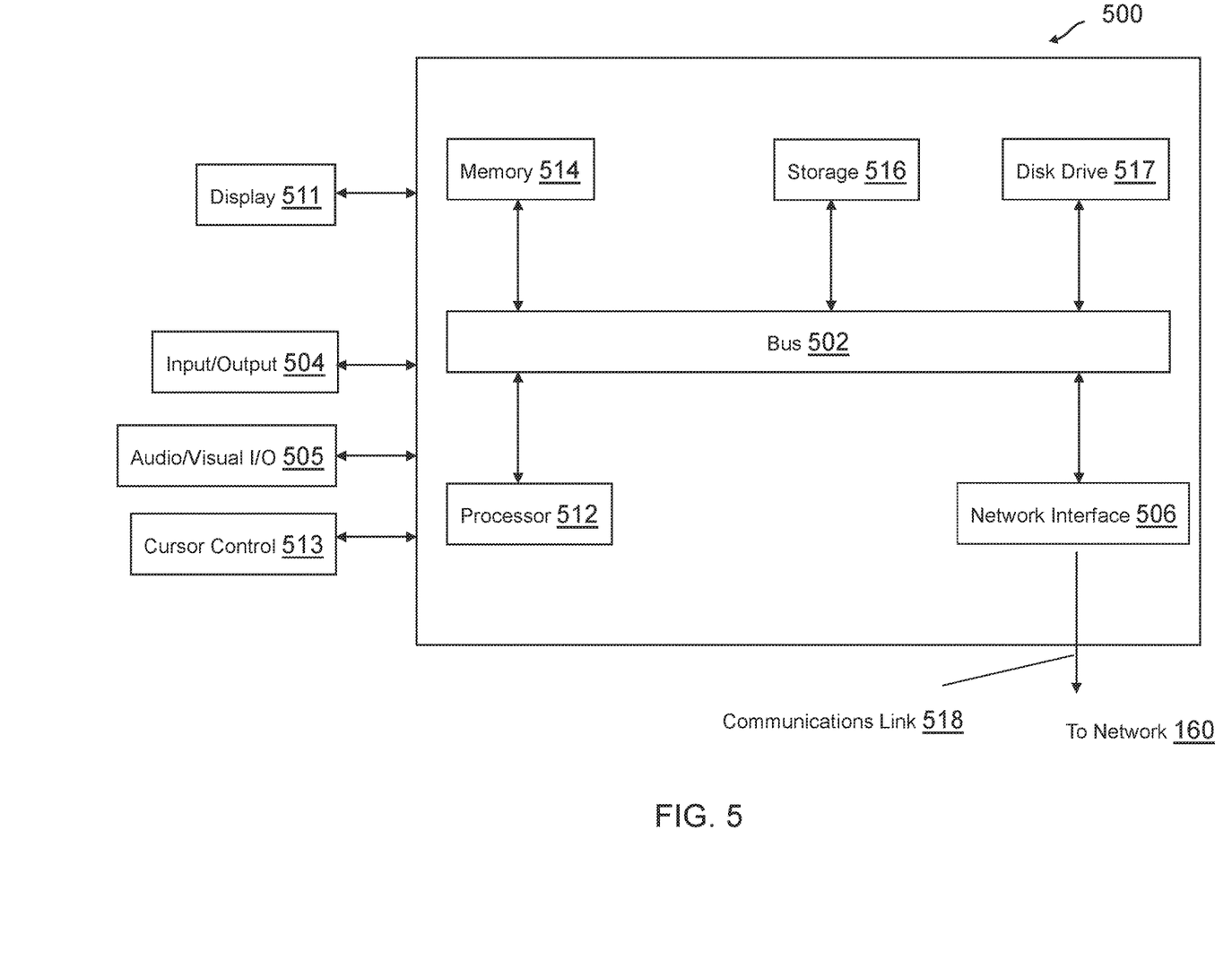
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
accessing a card history for a payment card, wherein the payment card is linked to a digital account with an online transaction processor, and wherein the card history comprises a plurality of transactions processed with a plurality of merchants using the digital account;
determining a plurality of merchant category codes (MCCs) assigned to the plurality of transactions on an electronic transaction network, wherein one of the plurality of MCCs is assigned to each of the plurality of transactions when each of the plurality of transactions is processed over the electronic transaction network;
determining total amounts for corresponding transactions of the plurality of transactions associated with each of the plurality of MCCs;
combining a first total and a second total of the total amounts into a combined total, wherein the first total is associated with a first one of the plurality of MCCs and the second total is associated with a second one of the plurality of MCCs; and
providing a first benefit to the digital account based on the combined total.

2. The system of claim 1, wherein the determining the total amounts occurs over a first time period for the card history, and wherein the determining the total amounts comprises aggregating individual transaction amounts for the corresponding transactions associated with the each of the plurality of MCCs.

3. The system of claim 1, wherein the first benefit is dynamically provided based on at least one of a monthly time, a yearly time, a planned expenditure, an upcoming travel, or a spending habit of a user associated with the payment card.

4. The system of claim 1, wherein the combined total comprises a first highest total of the total amounts, and wherein the operations further comprise:
selecting a second highest total of the total amounts, wherein the second highest total is associated with a second one of the plurality of MCCs, and wherein the second highest total is less than the first highest total; and
providing a second benefit to the digital account based on the second highest total.

5. The system of claim 4, wherein the operations further comprise:
selecting a third highest total of the total amounts, wherein the third highest total is associated with a third one of the plurality of MCCs, wherein the third highest total is less than the first highest total and the second highest total; and
providing a third benefit to the digital account based on the third highest total.

6. The system of claim 1, wherein prior to the combining, the operations further comprise:
determining, for a user associated with the payment card, a spend habit category from the plurality of MCCs during one of a time of year, a yearly season, or a holiday season, wherein the selecting the first total is based on the spend habit category.

7. The system of claim 1, wherein the first benefit is provided at a close of a cycle for the card history, and wherein the first benefit is provided as a balance adjustment for a balance of the digital account.

8. The system of claim 1, wherein the system includes an application programming interface (API) integration with the electronic transaction network, and wherein the card history is accessed and the plurality of MCCs are determined using the API integration.

9. The system of claim 1, wherein the first benefit comprises one of a balance increase based on a first percentage or a first amount of the combined total.

10. The system of claim 1, wherein the plurality of MCCs correspond to a plurality of transaction spend categories.

11. A method comprising:
    accruing, based on a plurality of category codes for a digital payment network, a plurality of transaction totals for transactions processed using an account over a time period, wherein each of the transactions is associated with a corresponding one of the plurality of category codes;
    determining, at an end of the time period, a first highest total for first codes of the plurality of category codes and a second highest total for a second one of the plurality of category codes, wherein the first codes are associated with subcategories of a first category and the second one of the plurality of codes is associated with a second category, different from the first category;
    determining a first percentage of the first highest total and a second percentage of the second highest total; and
    assigning a first value to the account for the first percentage and a second value to the account for the second percentage.

12. The method of claim 11, further comprising:
    determining, at the end of the time period, a third highest total for a third one of the plurality of category codes;
    determining a third percentage of the third highest total; and
    assigning a third value to the account for the third percentage.

13. The method of claim 11, wherein the first percentage is a larger percentage than the second percentage based on a value assignment rule for the account.

14. The method of claim 11, wherein the plurality of category codes comprise alphanumeric identifiers associated with a plurality of transaction spend categories.

15. The method of claim 11, wherein the first value and/or the second value are assigned to at least one of a digital value balance, a savings balance, an investment portfolio, or a donation fund.

16. The method of claim 11, wherein the account comprises a digital peer-to-peer payment account associated with a mobile application for accessing the account, and wherein the plurality of transaction totals are processed by an electronic transaction processor associated with the digital payment network using at least one of the mobile application or a payment card associated with the digital peer-to-peer payment account.

17. The method of claim 11, wherein prior to the determining, at the end of the time period, the first highest total and the second highest total, the method further comprises:
    providing an estimate of the first value and the second value based on the accruing the plurality of transaction totals, wherein the providing the estimate of the first value includes an identification of the first one of the plurality of category codes and the second one of the plurality of category codes.

18. A non-transitory machine-readable medium having stored thereon machine-readable instructions executable to cause a machine to perform operations comprising:
    aggregating total amounts of transactions processed using an account over a time period based on code designations for the transactions on a digital network, wherein the digital network is used for processing the transactions with merchants through an online transaction processor, and wherein one of the total amounts is based on multiple code designations from a category;
    selecting the one of the total amounts associated with the multiple code designations from the category based on a reward selection rule for the account;
    determining a reward benefit for the account based on the one of the total amounts and the reward selection rule; and
    providing the reward benefit to the account.

19. The non-transitory machine-readable medium of claim 18, wherein the operations further comprise:
    dynamically determining a merchant preference for a user corresponding to the account based on one of an upcoming expenditure or a time period, wherein the merchant preference is associated with the one of the total amounts,
    wherein the reward benefit is dynamically determined and provided based on the merchant preference.

20. The system of claim 1, wherein the first one and the second one of the plurality of MCCs are subcategories of a category.

* * * * *